United States Patent [19]

Kirkland

[11] Patent Number: 5,245,588
[45] Date of Patent: Sep. 14, 1993

[54] REGENERATIVE RADIO-FREQUENCY WIRE DETECTOR

[75] Inventor: James L. Kirkland, Panama City, Fla.

[73] Assignee: The United States of America as represented by the Secretary of the Navy, Washington, D.C.

[21] Appl. No.: 216,151

[22] Filed: Jan. 7, 1972

[51] Int. Cl.⁵ ............................................. H04B 11/00
[52] U.S. Cl. ......................................... 367/131; 324/67
[58] Field of Search ................. 340/4 R; 343/6.5 R; 324/66, 67; 367/131; 102/427; 342/20

*Primary Examiner*—Daniel T. Pihulic
*Attorney, Agent, or Firm*—William C. Townsend; Kenneth Dobyns

[57] ABSTRACT

A regenerative radio-frequency wire detector is disclosed which incorporates a radio antenna and a radio receiver connected thereto. A radio transmitter is timely energized by an output signal from the aforesaid radio receiver which, in turn, causes the transmitting of electromagnetic energy within the environment ambient to the wire to be detected. A commercial radio station or other source is employed as a covert initial energizer of the wire to be detected. When so energized, said wire re-radiates electromagnetic energy to the receiving antenna which starts the regenerative processing within the system loop constituting the radio receiving antenna, the radio receiver, the radio transmitter, the transmitting radio antenna, the wire, and the environmental medium or mediums within which it is disposed. Due to the amplification effected by the aforesaid regeneration process, the detection of marine mine command wires, for example, is facilitated.

19 Claims, 1 Drawing Sheet

REGENERATIVE RADIO-FREQUENCY WIRE DETECTOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to electromagnetic energy transmitting and receiving system combinations, and, in particular, it is an improved method and means for detecting wires, pipes, and other metallic objects which are partially submerged in water and partially extending out thereof In even greater particularity, it is a highly covert regenerative radio-frequency detector of insulated command wires of, for example, the type that are connected between river and other marine mines located in water and the firing boxes therefor that are usually located somewhere on land adjacent to said water.

DESCRIPTION OF THE PRIOR ART

Heretofore, the bottoms of rivers, estuaries, bays, lakes, and oceans believed to be mined with mines that are electrically detonated by lead wires connected to electrical power supplies on the bank or ambient beach thereof, respectively, have been dragged or swept with large heavy chains containing various and sundry types of grapples and/or wire cutters. For some purposes and under some circumstances, such arrangement has proven to be quite satisfactory. However, for many operational situations, it leaves a great deal to be desired, because no positive determination is obtained that such command wires are present or have been swept. Hence, the detection and disabling of such wires are more or less left up to chance, inasmuch as the conditions of the water and the circumstances under which it is being traversed often prevents any actual inspection to determine the effectiveness thereof. As a result, people navigating and working in mined waters perform their tasks under extremely hazardous conditions.

A more sophisticated mine command wire detection system has been employed, whereby electromagnetic energy is broadcast within and throughout that volume of water containing marine mine command wires. Then, by use of radio receivers and directional antennas, that portion of said broadcast electromagnetic energy that is picked up by the underwater portion of said command wires and re-radiated therefrom by that portion thereof not located within the water is sensed, and, thus, the presence and location of such wires are indicated. Again, for many practical purposes, such systems are quite satisfactory; however, their operation is not as covert as is desired, say, during Naval or other tactical maneuvers.

SUMMARY OF THE INVENTION

Where the safety of military personnel and equipment is concerned, it may readily be seen that effecting a far more positive detection of marine mine command wires is of paramount importance. This is especially true with respect to muddy rivers or other turbid waters which must be navigated in enemy territory by ships, boats, barges, and other marine or submarine vehicles, in order to transport much needed supplies and people to inland battle areas or other strategic locations.

The instant invention overcomes many of the disadvantages of the aforementioned prior art, in that its operation is exceedingly covert—as far as an enemy is concerned—and inasmuch as its wire detection accuracy and efficiency are ordinarily much better than any other known devices.

At the outset, it may be noteworthy that the regenerative radio-frequency wire detector constituting this invention was developed primarily for the purpose of locating the electrical command wires of river mines and, thus, it, indeed, achieves a worthwhile result for such purpose. However, it should be obvious to one skilled in the art having the benefit of the teachings presented herewith that it has numerous other applications, too. Accordingly, without any limitation intended, in order to keep this disclosure as simple as possible, the subject invention will be structurally disclosed as being predominantly a wire detector, and more specifically, a marine mine command wire detector, having a portion thereof submerged within river water along with the mine to which it is connected, and having a portion thereof extending out of said water upon the river bank and connected to a conventional electrical power supply and firing box.

It is, therefore, an object of this invention to provide an improved method and means for detecting insulated river mine command wires laying on or perhaps partially submerged in muddy or sandy river bottoms and which extend upon the river bank to a firing box.

Another object of this invention is to provide an improved method and means for ascertaining those rivers, canals, lakes, bays, channels, estuaries, oceans, or other locations, which would definitely make marine transport vehicles traveling thereon vulnerable to destruction by marine mine and/or military attack.

A further object of this invention is to provide an improved method and means for locating insulated electrical conductors and other metallic objects that are partially disposed within a subaqueous medium and partially extend into an atmospheric medium.

Still another object of this invention is to provide a regenerative radio frequency wire detector that, for most practical purposes, operates in a covert manner, as far as enemy surveillance is concerned.

Another object of this invention is to provide a regenerative radio frequency wire detector that may be monitored by other friendly but perhaps remote stations without requiring the use of additional telemetering links.

Still another object of this invention is to provide an improved, passive, regenerative radio frequency wire detector that employs one or more types of natural ambient electrical noise as an operative element thereof, thereby being completely clandestine in its detection operations.

A further object of this invention is to provide an improved passive, regenerative radio frequency wire detector that employs the signals broadcast from a commercial or other radio transmitter as an operative element thereof, thereby being substantially covert in its detection operations.

Another object of this invention is to provide a method and means which facilitate the subsequent tagging and/or cutting of marine mine command wires, thereby expediting the disabling, detonation, or neutralizing thereof, as desired.

Another object of this invention is to provide a method and means for locating wires and other metallic objects within predetermined environmental mediums that are easily and economically constructed, deployed, operated, and maintained.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENTS

Figure 1:
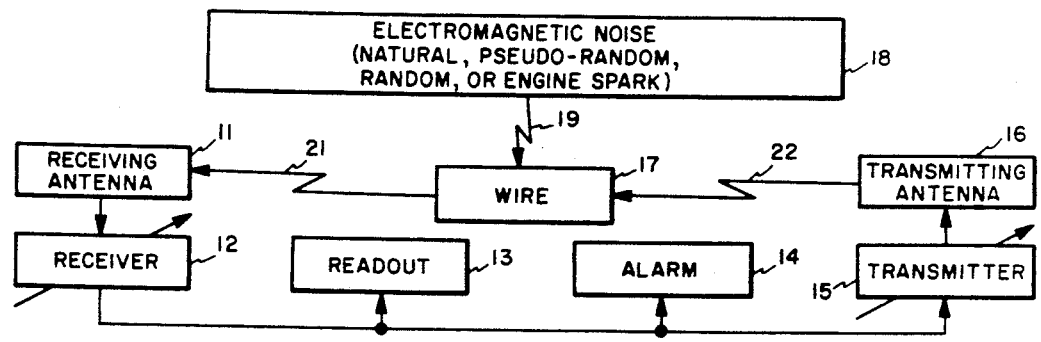
FIG. 1 is a block diagram showing the species of the subject invention which incorporates the most basic concept thereof.

Referring now to FIG. 1, the basic system concept is shown as including a receiving antenna 11. Said antenna, of course, may be any of the numerous types of electromagnetic transducers that are responsive to electromagnetic energy and produce an electrical signal that is proportional thereto. However, inasmuch as antenna 11, in this particular instance, will be disposed in water during wire hunting and detecting operations, it is preferably insulated to be electrically non-conductive with respect to its ambient environment. Obviously, many radio antennas which meet such requirements are commercially available, and, hence, it would be well within the purview of one having ordinary skill in the art to either select, redesign, or design one that would be suitable for the purposes of this invention.

The output of receiving antenna 11 is connected to the input of a tuneable radio receiver 12 which, in turn, further processes the signals received from antenna 11, so they will be in more useful form and, thus, enable radio receiver 12 to produce an output signal that is proportional thereto.

The output of radio receiver 12 is connected to the inputs of any suitable readout 13 and alarm 14. Of course, said readout 13 may be designed and calibrated to readout the signals supplied thereto in any desired terms; however, it has been determined that an ordinary recording voltmeter, for example, is quite satisfactory for such purpose. Moreover, alarm 14 may be of any conventional type that will alert a human or other operator that a signal that exceeds some preset threshold voltage has been supplied thereto by the aforesaid receiver 12.

The trigger input of a tuneable radio transmitter 15 is also connected to the output of the aforementioned radio receiver 12. Radio transmitter 15 may optionally be designed to produce a signal at the output thereof that is either identical in frequency to that received at the trigger input thereof from the aforesaid radio receiver 12, or it may be designed to produce an output signal having some other frequency that would make the entire system constituting this invention more useful during any given operational circumstances. In addition, it may be designed to be sufficiently broadband to produce any number of desired frequency signals, if so doing would optimize the usefulness thereof during any given operational circumstances or if it would make the entire system more versatile and, thus, more effective for operation in a variety of wire hunting and detecting situations.

The output of radio transmitter 15 is connected to the input of a transmitting radio antenna 16. Of course, transmitting radio antenna 16 may be any appropriate conventional type electromagnetic transducer that will convert electrical energy to electromagnetic energy proportional thereto and broadcast it throughout its ambient environmental medium. It may or may not be insulated from said ambient environmental medium, depending on the physical characteristics thereof, especially the electrical conduction characteristics thereof, and it may be either omni-directional or uni-directional, as desired. Obviously, again, the artisan could readily select the proper transmitting radio antenna for any given operational circumstances.

A wire 17 (or any other electrical conductor) is the object to be hunted, detected, and perhaps identified by the system comprising the aforementioned interconnected components. It is ordinarily of the insulated type when used as a command wire for conducting electrical current to detonate electrically responsive marine mines; however, under certain circumstances it need not be and, thus, may not, from an electrical conduction standpoint, be insulated from its ambient environment. Furthermore, wire 17 may be disposed in any one environmental medium, or it may be disposed in two or more thereof. For example, because it is herewith intended that the species of the invention depicted in FIG. 1 incorporates a very general inventive concept, it may be said that wire 17 may be any electrically conductive material or object that is located in water, in the ground, in air, in space, in any material, or in any combination thereof. But, because, as previously suggested, the subject invention will be disclosed as being a marine mine command wire for the purpose of keeping this disclosure as simple as possible, wire 17 is herewith designated, without limitation, as being an electrically conducting wire that is partially submerged in water and partially extends out of said water, inasmuch as such configuration would be that which would occur if it were connected between a marine mine located in river water and a firing box located on the bank thereof or deployed on other land adjacent thereto. In other words, the only disposition requirement of wire 17 is that it be located where it will be exposed to and, thus, able to receive and be responsive to electromagnetic energy, regardless of the source thereof.

In the embodiment of FIG. 1, the operation may be passive, in that it contains no means for initially supplying the electromagnetic energy received by receiving antenna 11. Nevertheless, a source of electromagnetic energy is necessary to the operation thereof. Hence, in this particular species, electromagnetic noise 18 is used as the initial operative element therefor. Said electromagnetic noise 18 may, for example, be natural—that is, inherent in nature—and, therefore, it may consist of electrically generated static from lightening or other climatic or magnetic conditions. It may also be generated by man-made devices, such as random generators, pseudo-random generators, internal combustion engine sparks, and the like, the only requirement therefor being that it is capable of being sensed or picked-up by wire 17, regardless of the ambient environment thereof. Accordingly, electromagnetic noise 18 is transferred as electromagnetic energy 19 to wire 17, which re-radiates it as energy 21 to receiving antenna 11. As will be discussed more fully below in the discussion of the operation of this embodiment of the invention, the reception of energy 21 by antenna 11 effectively causes electromagnetic energy 22 to be broadcast by transmitting antenna 16 back to wire 17 with increased power due to the regenerative processes effected by the entire system.

Figure 2:
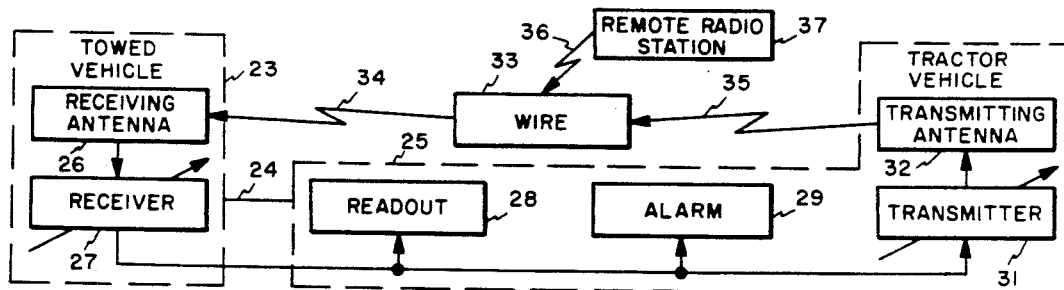
FIG. 2 is a block diagram showing the species of the subject invention incorporating a predetermined, remotely supplied operative signal element.

Referring now to FIG. 2, there is shown another species of the subject invention as including a towed vehicle 23, say, of the type that may be towed underwater by a cable 24 connected to a tractor vehicle 25 (such as a boat, or the like) traveling along a predetermined course on the surface of the water. Of course, tractor vehicle 25 could also be a submarine vehicle, an aircraft, or any other type vehicle suitable to the environmental medium within which it is intended to operate.

Included within towed vehicle 23 is a receiving radio antenna 26, with a tuneable radio receiver 27 connected to the output thereof. The output of radio receiver 27 is connected to the inputs of a readout 28 and an alarm 29, as well as to the trigger input of a tuneable transmitter 31, the latter trio of elements preferably being mounted in or on said tractor vehicle 25. Connected to the output of radio transmitter 31, is a transmitting radio antenna 32, likewise mounted on tractor vehicle 25.

A wire 33, herewith defined as the command wire connected between an underwater mine and a firing box (not shown in this view) is partially located within the water that vehicle 23 is intended to be towed and partially located out of said water because it runs upon the bank or beach thereof. Like wire 17 of FIG. 1, it, too, senses and re-radiates electromagnetic energy 34, and thereby causing transmitting antenna 32 to broadcast electromagnetic energy 35 back thereto, as will be explained subsequently. However, this particular species of the invention operates as a result of the presence of electromagnetic energy 36 being broadcast by, say, a commercial radio station 37 that is located close enough to the wire hunting operations that its signal may be received.

Being a commercial radio station, station 37 would broadcast electromagnetic signals containing the usual programmed information for the particular area where it is located. Hence, because the instant species of the invention makes use of such commercial electromagnetic signals as the operative signal therein, no anomalous signal is either generated or used thereby which could alert an enemy of the presence of a wire hunting expedition. Of course, the covertness which this effects is, indeed, advantageous, since it, in turn, provides a degree of safety to the personnel and equipment involved in such expeditions that otherwise would not be obtained.

On the other hand, it is entirely possible that a regular commercial radio station may not exist in, say, some remote areas of the world where it is necessary to perform marine mine command wire operations as a tactical military maneuver. Hence, although it is unlikely for most practical purposes, in the event no such commercial station 37 exists that has sufficient power to act as a system component in the device of FIG. 2, any suitable portable or temporary radio station may be substituted therefor. For example, such substitute radio station could be carried by marine vehicle 25, or it could be located at some base camp some distance away from the mine hunting operations. It could also be located on a suitable aircraft, land vehicle, water craft, or walking person, the mobility of which would also provide some degree of safety to the personnel and equipment necessary to its operation. Of course, the type and power of the signal broadcast thereby should be selected to be as covert as possible and still be as useful as possible for its intended purposes.

Figure 3:
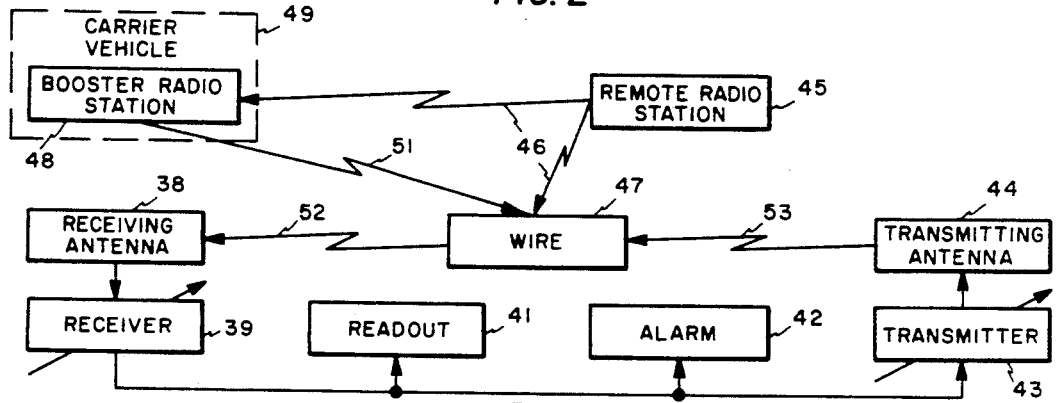
FIG. 3 is a block diagram showing the species of the subject invention which incorporates a booster for the predetermined, remotely supplied operative signal element of the species of FIG. 2.

FIG. 3 depicts a system that is somewhat similar to that of FIG. 2, except that it may have one or more ancillary components added thereto. Thus, it contains a receiving antenna 38, with the output thereof connected to the input of a tuneable radio receiver 39. The output of radio receiver 39 is connected to the inputs of suitable readout 41, alarm 42, and tuneable radio transmitter 43, the output of which is connected to the input of a transmitting radio antenna 44. Again, a remote radio station 45 broadcasts its commercial or other signals 46 which may or may not be strong enough to be picked up by marine mine command wire 47. In the event signal 46 is too weak to be effective, it may be boosted by an intermediately disposed booster radio station 48 mounted on any convenient mobile carrier vehicle 49, such as on another boat, an airplane, land vehicle, or person, for instance. In such case, commercial or other electromagnetic signal 46 is rebroadcast as a higher power electromagnetic signal 51. Because it is picked up and reradiated as signal 52 by wire 47, it becomes the operative or control signal which, after appropriate processing is radiated back to wire 47 as regenerative electromagnetic signal 53, as will be discussed more fully subsequently.

Figure 4:
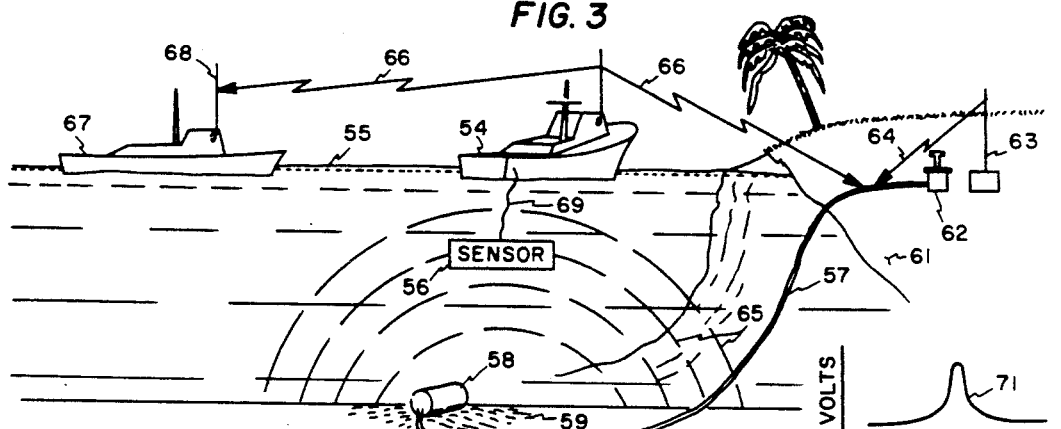
FIG. 4 is a quasi-pictorial view of exemplarily environmental conditions within which any of the species of the subject invention will operate to an advantage, but particularly illustrating the use of a modified version of the species of FIG. 2 therein.

FIG. 4 is a schematic quasi-pictorial view of the conditions under which the subject invention will operate satisfactorily. At the outset, it should not be considered as limiting the possible operational procedures possible within the scope of this invention. Instead, it should only be considered as being an illustration of an exemplary operational situation which could incorporate any or all of the specific system species shown in FIGS. 1 through 3, or any combination thereof.

Therefore, in the representative illustration of FIG. 4, there is shown a river boat 54 that is traveling a predetermined course up or down a river 55. As it travels along, it tows an underwater electromagnetic energy sensor 56 which contains either an appropriately designed antenna or an appropriately designed antenna-radio receiver combination, depending on amplification factors involved during any given operational situation. In the former case, of course, said radio receiver and its associated readout, alarm, transmitter, and transmitting components would, in all probability, be located on boat 54. In the latter case, all of said components except, perhaps, the receiving antenna and radio receiver would probably be located on boat 54.

As boat 54 travels, say, up the river (the usual situation) it hunts for one or more electrical conductors constituting a command wire 57, part of which is submerged within water 55 and connected to an electrically detonated marine mine 58 laying on or possibly partially or entirely buried in the river bottom 59, and part of which extends upon river bank 61 and is connected to a typical electrically powered firing box 62. Such firing boxes are usually not located in plain view but, instead, are ordinarily located in the bushes, reeds, trees, or the like, located near the river bank, so that the box and the enemy operating it cannot readily be seen from the river, the air, or surrounding land areas.

FIG. 4 is obviously not drawn to actual scale; therefore, a remote commercial or other radio station 63 is also located on land. As a general rule, such radio station 63 would be located in a town or village some distance away from river 55, but it need not be. In any event, it ordinarily broadcasts commercial programs of interest to the people, if any, in the vicinity of river 55 and, thus, its electromagnetic signal 64 can be used as the operative signal in the invention, inasmuch as it is picked up or sensed by that portion of wire 57 located in the atmosphere. Due to its inherent nature and its physical disposition, wire 57 re-radiates signal 64 as electromagnetic signal 65 within river water 55 and again it is broadcast as regenerative signal 66 back to wire 57, as a result of having been received by sensor 56 and processed through the subject invention.

Another feature of the invention, though optional, that has proven to be worthwhile is that in the event some remote or other vessel 67 desires to be informed that a command wire has been located, the momentary broadcasting of regenerative signal may be received by suitable radio reception apparatus 68 located thereon, thereby eliminating the need for additional telemetering apparatus for such purpose. Of course, ship 67 may be one that will tag or cut command wire 57, or it could be a following ship or boat of the type that is desired to be protected from river mines, a convoy thereof, or a friendly base camp, as will also be mentioned again during the discussion of the operation of the invention presented below.

At this time, it would appear to be noteworthy that each of the aforementioned components making up the various disclosed species of the invention are well known and conventional, per se hence, it is to be understood that it is their respective combinations that are new and unique and which cause the improved wire detection results to be effected.

Furthermore, it should be understood that any of the individual components of the subject wire detecting systems may be deployed at any location within the ambient environment that will facilitate the optimum operation thereof. One case in point, as is already known in the art, the underwater electromagnetic sensor may only include an antenna appropriately insulated and designed for maximum underwater radio energy reception, with the radio receiver to which it is attached being located in the tractor vehicle or boat. On the other hand, as is also well known in the art, if, in order to be effective, amplification and other signal processing is required before the signal sensed by the antenna is conducted to associated utilization readout, alarm, or other apparatus, the radio receiver may be combined with the antenna as a unitary package that is towed underwater substantially along the river bottom. The proper design selection in such instances would probably be dependent upon the length of and resulting electrical loss incurred in tow cable-electrical conductor 69, as it is exemplarily depicted in FIG. 4. Obviously, the implementation of the most suitable design for any given operational circumstances would be well within the purview of one skilled in the art having the benefit of the teachings presented herewith.

MODE OF OPERATION

The operation of each of the aforesaid species of the subject invention will now be discussed briefly in conjunction with its respective figure or figures of the drawing.

Referring first to FIG. 4, let it be assumed that each of the species of the invention are functionally implied therein, at least to the extent possible in accordance with its particular structural configuration. Therefore, as may be seen in FIG. 4, the general mode of operation of the invention is to tow the electromagnetic sensor along the bottom of the river where it is thought that marine mines and their command wires may be located. From such generalization, the transition to the operation of the system of FIG. 1 should immediately become apparent.

For example, if receiving antenna 11 is towed along the river bottom and, as a consequence thereof, approaches command wire 11, the closer it approaches thereto the more it receives the electromagnetic energy radiating therefrom throughout the river water ambient thereto. In this particular embodiment, by definition, electromagnetic noise signals, such as those created by natural atmospheric disturbances—colloquially called static—is received by that portion of wire 17 located in the atmosphere and re-broadcast throughout the water along that portion of the wire that is located in the river water. Upon impact with antenna 11 it is converted to proportional electrical signal that is then coupled to receiver 12 which, in turn, is designed to process said electrical signal to a useful level by amplification, filtering, detecting, etc., as is conventional in the ordinary radio receiver. As a result, receiver 12 produces an output signal that is indicated and/or recorded by readout 13. However, at this stage of the wire detection process, the output signal from radio receiver 12 may not have such an amplitude as to be meaningful to a human operator or to trigger alarm 14. Nevertheless, it does trigger transmitter 15 into generating either a similar or predetermined different signal 22 that, in turn, is broadcast through the atmosphere by antenna 16. Of course, that portion of wire 17 that is laying on the river bank picks up signal 22 and re-radiates it to underwater receiving antenna 11. The signal processing through the entire system, of course, is so rapid and so rapidly reoccurring that regeneration is effected therein. As a result of such regeneration, the receiver output signal builds up very rapidly in amplitude as the distance between antenna 11 and wire 17 is decreased. As a matter of fact, it becomes sufficiently large in magnitude to produce the leading edge of a blip or spike-like signal at readout 13 and causes the threshold setting of alarm 14 to be exceeded to thereby start the alarm.

As the wire is crossed, the receiver output is maximum, and as antenna 11 continues along its course, its response to the re-radiated signal from wire 17 becomes less and less because the distance therebetween becomes greater and greater. As a result, regeneration within the entire system decays rapidly, thereby creating a rapidly diminishing following edge in the receiver 12 output signal. Of course, due to the fact that acquiring a wire—that is, approaching it and moving away from it as it is being hunted—causes a substantially spike-like voltage signal 71 similar to that shown in FIG. 5, to be generated and read out with respect to some known reference parameter (such as, for example, the location of the tractor or towed vehicles), it becomes an indicator of the presence and location of such wire. Obviously, the readout incorporated in this invention may be calibrated in any terms that would facilitate a human operator's recognizing that a marine mine command or other wire had been located and/or crossed.

Because the crossing of wire 17 occurs rapidly due to the movement of the tractor vehicle, the actual detection and indication of the presence of a command wire is so short from a time duration standpoint, that it only reads out as a spike 71 of high energy static to any enemy electronically eavesdropping thereon to determine the presence of mine hunters. Thus, the entire mine hunting becomes quite clandestine, so far as electronic surveillance is concerned.

Figure 5:
FIG. 5 is a graphical illustration of an exemplarily blip type of readout that may occur as a result of the subject invention detecting and crossing over a marine mine command wire.

It should be understood, however, that the exact configuration of the signal that indicates the acquiring of a command wire may vary with the type of sensor or antenna employed in the subject wire detector system. Hence, the waveform depicted in FIG. 5 is intended to be representative only, inasmuch as others may be used, too, as long as the appropriate calibration thereof is effected.

As previously suggested, electromagnetic noise signals broadcast by pseudo-random noise generators, random noise generators, and engine sparks may be substituted for natural sources of the aforesaid static, in the event sufficient static is not available or is not of such magnitude to be useful. In any event, the regenerative operation of the system of FIG. 1 works the same way, regardless of the electromagnetic noise source.

The species of FIG. 2 functions in the same manner as the species of FIG. 1, except a regular commercial radio station is used to supply the actuation signal. Hence, it is the electromagnetic energy signal broadcast by remote radio station 37 that is sensed by antenna 26 and regenerated within the system of FIG. 2.

In the event a commercial station is not available at or near any given site of wire detection operations, a similar or particularly designed one may be deployed and used for such purpose. Deployment thereof may be at any desired location and could be mounted on a mobile vehicle if desired.

Again, the basic system of FIG. 3 is similar to those of FIGS. 1 and 2 and functions in a substantially similar manner, except that in the event remote radio station 45 is too distant to have enough power to be sensed by wire 47, a booster radio station 48 may be employed. Radio station 48 may be mounted on its own carrier vehicle 49, so that it may be maneuvered to provide optimum rebroadcast of electromagnetic energy 46 as boosted electromagnetic energy 51, thereby energizing wire 47 sufficiently to make the entire system regenerate, and produce a blip at the readout whenever wire 47 is crossed.

As may readily be seen by the artisan, many combinations and permutations of the disclosed species of the invention may be assembled as necessary to meet the requirements of any given operational circumstances. So doing, of course, would be the design choice of the artisan and, thus, would be well within the scope of the invention.

In addition, it may be noteworthy that all of the foregoing species of the subject invention may include transmitters that produce only parts of the signal supplied thereto or, in the alternative, may produce signals for broadcast that have frequencies that are entirely different from those sensed and re-radiated by the command wires being hunted and acquired, in the event so doing expedites the detection and identification of said wires or other underwater objects.

Again, as represented in FIG. 4, monitor vehicle (or vehicles) 67 having suitable receiving apparatus would likewise be able to receive regenerated signal 66 without additional telemetering or communication equipment. Hence, any maneuvers warranted by the circumstances could be taken by said vehicle or vehicles 67 in a covert manner.

As may readily be seen, for all practical purposes, the systems constituting the above mentioned species of the invention are inoperative until the electromagnetic re-radiation from a command wire is acquired by the receiving antenna. Hence, the presence of a marine mine hunting task force is not likely to be detected by the electronic surveillance apparatus of an enemy. Moreover, due to the extremely short duration of the wire indicating regenerated signal and the substance thereof, it is also unlikely that such mine hunting operations would be recognized for what they are. As a result, electrically detonated enemy river and other marine mines may be effectively disabled because their command wires are located, tagged, and/or cut, as warranted by operational and tactical circumstances. This, in turn, promotes the safe passage of ships and other marine and submarine vehicles that may follow along behind the wire hunting task force. Of course, if expedient to do so, the mines whose command wires are located may be harmlessly detonated by additional means not constituting part of this invention to likewise promote the safe passage of friendly ships or the like.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Means for detecting an electrical conductor having a first portion capable of receiving an electromagnetic energy signal from an external source and a second portion electrically connected to but spatially disposed from said first portion for re-radiating the electromagnetic energy signal received by the aforesaid first portion, comprising in combination:

means for sensing and receiving the electromagnetic energy signal re-radiated from the second portion of the aforesaid electrical conductor and for producing an electrical output signal that is proportional thereto;

means effectively connected to the output of said electromagnetic energy signal sensing and receiving means for broadcasting another electromagnetic energy signal having a power that is greater than that of the aforesaid re-radiated electromagnetic energy signal in such manner that it is received by the first portion of said electrical conductor in response to the aforesaid electrical output signal therefrom; and means connected to the output of said re-radiated electromagnetic energy signal sensing and receiving means for the continuous reading out of the aforesaid electrical output signal therefrom in terms indicative of the detection of said electrical conductor.

2. The means of claim 1, wherein said electrical conductor is an insulated electrical conductor.

3. The means of claim 1, wherein said electrical conductor is an insulated electrical wire, adapted for being connected to an underwater electrically detonable marine mine at one end thereof, and adapted for being connected to a land deployed, electrically powered, firing box at the other end thereof.

4. The means of claim 1, wherein said first and second portions of said electrical conductor are located in the same environmental medium.

5. The means of claim 1, wherein said first and second portions of said electrical conductor are located in first and second environmental mediums, respectively.

6. The means of claim 1, wherein said first portion of said electrical conductor is located in the earth's atmosphere, and the second portion of said electrical conductor is submerged within water.

7. The means of claim 1, wherein the external source of said electromagnetic energy signal is electromagnetic noise which is generated by naturally occurring phenomenon.

8. The means of claim 1, wherein the external source of said electromagnetic energy is electromagnetic noise-like signals produced by a pseudo-random signal generator.

9. The means of claim 1, wherein the external source of said electromagnetic energy is electromagnetic noise produced by a random signal generator.

10. The means of claim 1, wherein the external source of said electromagnetic energy is electromagnetic noise generated by the sparks produced by the energized spark plugs of an internal combustion engine.

11. The means of claim 1, wherein the external source of said electromagnetic energy is the electromagnetic signals broadcast by a radio station.

12. The means of claim 1, wherein the external source of said electromagnetic energy is the electromagnetic signals broadcast by a commercial radio station; hence, making the commercial program signals broadcast thereby operative signals within said electrical conductor detecting means which do not effect an electromagnetic energy anomaly in the environment ambient thereto.

13. The means of claim 1, wherein said means for sensing and receiving the electromagnetic energy signal re-radiated from the second portion of the aforesaid electrical conductor and for producing an electrical output signal that is proportional thereto comprises:
a radio receiving antenna; and
a radio receiver connected to the output of said radio receiving antenna.

14. The means of claim 1, wherein said means connected to the output of said electromagnetic energy signal sensing and receiving means for broadcasting another electromagnetic energy signal having a power that is greater than that of the aforesaid re-radiated electromagnetic energy signal in such manner that it is received by the first portion of said electrical conductor in response to the electrical output signal therefrom comprises:
a radio transmitter capable of being triggered into an energized, broadcasting condition by said electrical output signal; and
a radio transmitting antenna connected to the output of the aforesaid radio transmitter.

15. The invention of claim 1, further characterized by mobile means connected to said re-radiated electromagnetic energy signal sensing and receiving means for the moving thereof along a predetermined course, so as to search for and detect said electrical conductor as a result of timely sensing and receiving the electromagnetic energy signal re-radiated by the second portion thereof.

16. The invention of claim 15, further characterized by powered means, having said another electromagnetic energy signal broadcasting means and said readout means mounted thereon, effectively connected to the aforesaid mobile moving means for the towing thereof along said predetermined course.

17. The invention of claim 1, further characterized by insulated mobile means connected to said re-radiated electromagnetic energy signal sensing and receiving means for the moving thereof along a predetermined course within water, so as to search for and detect that second portion of said electrical conductor that is disposed within said water.

18. The invention of claim 17, further characterized by powered means, having said another electromagnetic energy signal broadcasting means and said readout means mounted thereon, effectively connected to the aforesaid moving means for the towing thereof along said predetermined underwater course.

19. A method of detecting an insulated electrical conductor that is partially submerged in water and that partially extends out of said water in such manner as will enable it to receive and be energized by electromagnetic energy signals ambient thereto and in response thereto re-radiate said electromagnetic energy signals by that part thereof that is submerged in said water, comprising the steps:
receiving the electromagnetic energy signals re-radiated by the underwater part of said insulated electrical conductor while traversing through that underwater portion of the water ambient thereto;
converting said received electromagnetic energy signals into a continuous electrical signal that is proportional thereto at any given instant;
broadcasting a predetermined electromagnetic energy signal throughout the environmental medium that is ambient to that part of said insulated electrical conductor that extends out of said water in response to a predetermined magnitude of the aforesaid continuous electrical signal, so as by regenerative processes to increase the power of the electromagnetic energy signals re-radiating from that part of said insulated electrical conductor that is submerged within said water; and
reading out the aforesaid continuous electrical signal in terms that are indicative of the presence and underwater location of said insulated electrical conductor with respect to a known reference parameter.

* * * * *